(12) United States Patent
Raben

(10) Patent No.: US 9,340,067 B2
(45) Date of Patent: May 17, 2016

(54) TIRE HANDLING TOOL

(71) Applicant: Tom Raben, Evansville, IN (US)

(72) Inventor: Tom Raben, Evansville, IN (US)

( * ) Notice: Subject to any disclaimer, the term of this patent is extended or adjusted under 35 U.S.C. 154(b) by 401 days.

(21) Appl. No.: 13/964,760

(22) Filed: Aug. 12, 2013

(65) Prior Publication Data

US 2015/0041738 A1 Feb. 12, 2015

(51) Int. Cl.
*B66F 15/00* (2006.01)
*B60B 29/00* (2006.01)
*B60B 30/02* (2006.01)
*B66C 1/26* (2006.01)

(52) U.S. Cl.
CPC ............... *B60B 29/001* (2013.01); *B60B 30/02* (2013.01); *B66C 1/26* (2013.01); *B60B 2900/3312* (2013.01)

(58) Field of Classification Search
None
See application file for complete search history.

(56) References Cited

U.S. PATENT DOCUMENTS

| | | | | |
|---|---|---|---|---|
| 1,470,526 A * | 10/1923 | Cade | ........................ | B62B 1/14 414/455 |
| 1,892,979 A * | 1/1933 | Clark | .................... | B60B 29/002 280/47.24 |
| 2,525,437 A * | 10/1950 | Winzler | ................. | B60B 29/002 414/427 |
| 2,877,912 A * | 3/1959 | Di Giacomo | ......... | B60B 29/002 414/428 |
| 3,123,238 A * | 3/1964 | McKelvey | ............ | B60B 29/002 414/428 |
| 5,826,319 A * | 10/1998 | Colwell | .................. | B60C 19/00 29/407.04 |
| 6,135,466 A * | 10/2000 | Irwin | ........................ | B62B 1/12 280/47.19 |

* cited by examiner

*Primary Examiner* — Joseph J Hail
*Assistant Examiner* — Brian Keller
(74) *Attorney, Agent, or Firm* — Gary K. Price

(57) ABSTRACT

A tire handling tool used to assist a worker in positioning a tire from the horizontal or lying position to a vertical position. The tire handling tool generally including a first member connected to a second member, the second member defines a spacing, and further includes at least one stop. The second member includes a first end attached to the first member and a second end having a first bracket with wheels. The first member defines a second end that includes a second bracket having a roller member. A tubular member is attached to the first member and passes through the spacing of the second member. Urging the tool in a forward direction causes the tubular member to travel along the spacing towards the first bracket for receiving a tire that is in the lying position, and then urging the first member in a backward direction lifts the tire to a vertical position.

16 Claims, 4 Drawing Sheets

TIRE HANDLING TOOL

CROSS REFERENCES TO RELATED APPLICATIONS

U.S. Provisional Application for Patent No. 61/681,699, filed Aug. 10, 2012, with title "Tire Handling Tool" which is hereby incorporated by reference. Applicant claims priority pursuant to 35 U.S.C. Par. 119 (e)(i).

Statement as to rights to inventions made under federally sponsored research and development: Not Applicable.

BACKGROUND OF THE INVENTION

1. Field of the Invention

This invention relates generally to a tool that facilitates handling tires, and more particularly to a tool which assists in positioning a tire from the horizontal or lying position to a vertical position.

2. Brief Description of Prior Art

While there exists various tools for lifting and positioning of tires, such art is generally restricted to positioning the tire relative to the tire being mounted on the hub of a vehicle. The prior art is not suited for the simple task of assisting a single worker in positioning a tire from the horizontal or lying position to a vertical position where the tire can then be manually rolled to a destination. The task of repeatedly lifting a tire from a horizontal to a vertical position can be, in the long run, a source of work injury. Indeed, although tires are generally not exceedingly heavy, lifting one to its vertical position does involve a series of movements that can be a source of injury due to the repetitiveness of certain movements or the imbalance in the process of executing certain movements.

As will be seen from the subsequent description, the preferred embodiments of the present invention overcome disadvantages of the prior art. In this regard, the present invention discloses a tire handling tool that assists a single worker in repeatedly positioning a tire from a horizontal or lying position to a vertical position.

SUMMARY OF THE INVENTION

A tire handling tool used to assist a single worker in positioning a tire from the horizontal or lying position to a vertical position where the tire can then be manually rolled to a destination. The tire handling tool generally comprised of a first member and a first member connected to the first member. The second member includes first and second legs that are attached in parallel relation and define a space therebetween, and further includes at least one stop. A first end of the second member is adjustably connected to the first member and a second end defines a first bracket with wheels. The first member defines a first end and a second end that includes a second bracket having a roller member. A tubular member is attached to the first member such that the tubular member passes through the defined space of the second member.

Resting the first and second brackets on a tire that is in the horizontal position, and urging the tubular member forward expands the tool to an expanded position such that the first bracket and second bracket expands into communication with the tread surface of the tire. Then, urging the first member in a backward direction raises the first bracket, lifting the tire to a vertical position. The tire can then be released from the tool and the tire, in the vertical position, can then be rolled to its destination.

It is therefore an object of the present invention to provide for a tire handling tool to assist in positioning a tire from the horizontal or lying position to a vertical position.

It is a further object of the present invention to provide for a tire handling tool which is simple in construction, light weight and sturdy.

The tire handling tool of the present invention meets these objectives, and more.

DESCRIPTION OF THE PREFERRED EMBODIMENT

Figure 1:
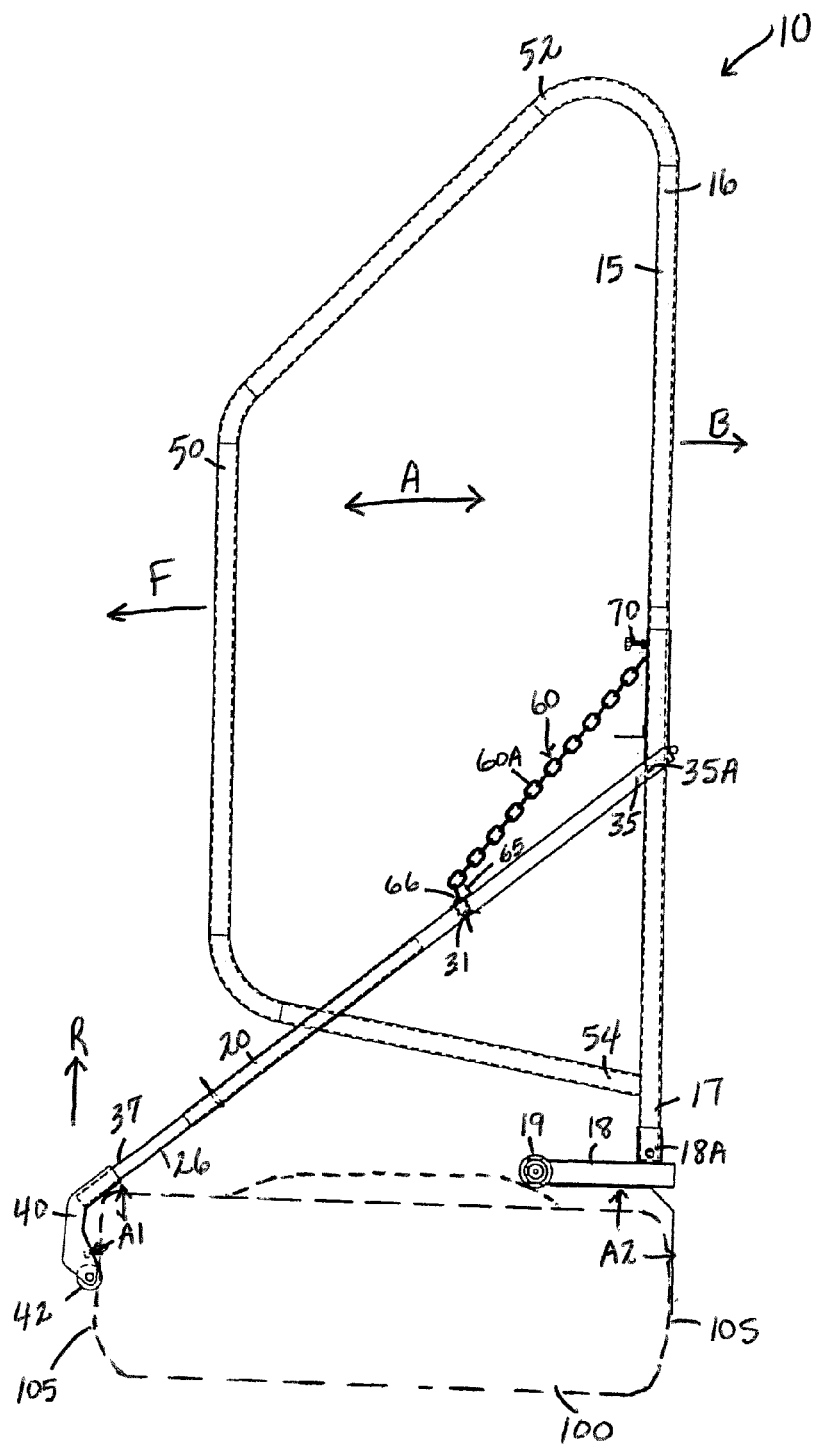
FIG. 1 is a side view of a preferred embodiment of the present invention, a tire handling tool, the tire handling tool shown in a first position with a prior art tire shown in broken lines.
Figure 2:
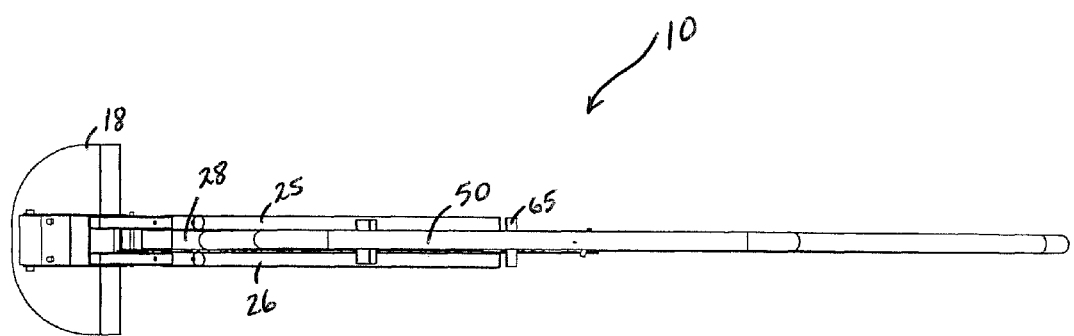
FIG. 2 is a top view of the tire handling tool.
Figure 3:
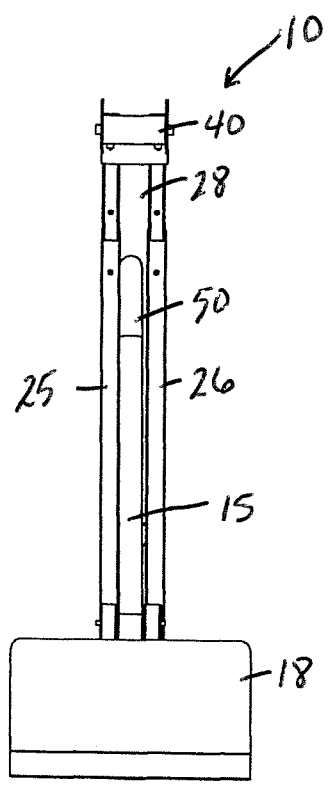
FIG. 3 is an end view of the tire handling tool.
Figure 4:
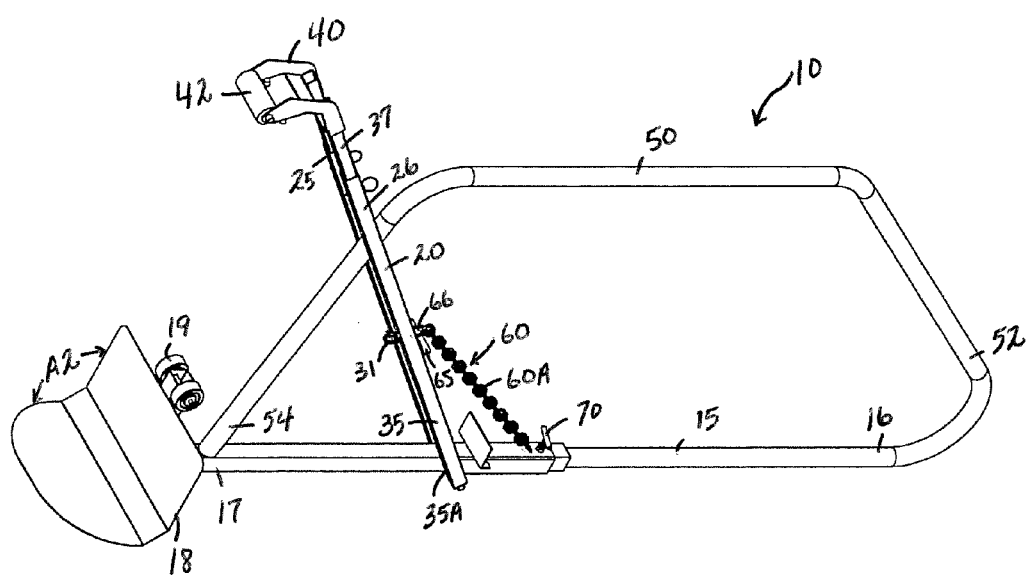
FIG. 4 is a side perspective view of the present invention, in a second position.

The present invention is directed to a tire handling tool that is used to facilitate handling tires. More particularly, the present invention is suited for the task of assisting a single worker in positioning a tire from the horizontal or lying position to a vertical position where the tire can then be manually rolled to a destination. In the broadest context, the tire handling tool of the present invention consists of components configured and correlated with respect to each other so as to attain the desired objective.

FIGS. 1-4 illustrate a tire handling tool 10 made in accordance with the present invention. The tool 10 represented by an assembly of elements creating a structural body generally comprised of a first member 15 and a second member 20 perpendicularly connected to the first member 15.

As illustrated, the second member 20 define legs 25, 26 that are positioned in parallel relation and define an elongated space 28 therebetween, and further includes at least one stop 31. The stop 31 can be adjustable along the length of the second member 20.

A first end 35 of the second member 20 is pivotally connected 35A to the first member 15, and a second end 37 opposite the first end 35 includes a first bracket 40 with at least one wheel 42. The first bracket 40 defining an angle A1 of about 90 degrees.

The first member 15 defines a first end 16 and a second end 17 opposite the first end 16. A second bracket 18 having a roller member 19 is hinged 18A to the second end 17. The second bracket 18 defining an angle A2 of about 90 degrees.

A tubular member 50 includes a first end 52 and second end 54, where the first end 52 is attached to the first end 16 of the first member 15 and the second end 54 of the tubular member 50 is attached to the second end 17 of the first member 15. In the alternative, the ends 52, 54 of the tubular member 50 may be integral to the first member 15. As further illustrated the tubular member 50 as described passes through the defined elongated space 28 of the second member 20, and is disposed between the stop 31 and first bracket 40. As will be described, the first member 15 can be urged in a forward or backward direction (arrow A in FIG. 1).

FIG. 1 illustrates the tool 10 when preparing to position a tire 100 from the horizontal, lying position, to the vertical or rolling position so the tire can be manually rolled to a destination. In application, the worker will position the tool 10 in a first position, on top of the tire so that the brackets 18, 40 rest on the tire. Referring to FIG. 1 shows a tire 100 in the horizontal or lying position, and the tool 10 in the first position. As illustrated, the brackets 18, 40 are angled A1, A2, to appropriately receive portions of the tire tread surface 105. The worker can then proceed to urge the tubular member 50 in a forward direction (arrow F in FIG. 1) causing the tubular member 50 to travel along the defined space 28 in a first direction towards the bracket 40, and the tool 10 to expand such that the first bracket 40 and second bracket 18 are in communication with the tread surface 105 of the tire 100 (as shown in FIG. 1). In this position the tubular member 50 is in the expanded, first position. Then, urging the first member 15 in a backward direction (arrow B in FIG. 1) places to tool 10 in a second position, and causes the tubular member 50 to travel along the defined space 28 in a second direction, opposite the first direction, causing the first bracket 40 to raise, and lifting R the tire 100 to a vertical position. The tool 10 in the second position is shown in FIG. 1. As such, the first member 15 cooperates with the second member 20 and bracket 40 as the worker urges the first member 15 in a backward B direction, to the second position.

The second bracket 18 is also in communication with the tire tread 105 by way of the adjustment hinge 18A that positions strategically as the first member 15 is urged as discussed. In the vertical position, the tire 100 can then be released from the tool 10 and the tire, in the vertical position, can be manually rolled to a destination. Thus the worker need not exert himself or risk injury when performing the task of lifting a tire from its horizontal, lying position to a vertical position as described.

The tool 10 can further include a link member 60 defined by a number of links 60A. The link member 60 having a first end 61 attached to first member 15, and a second end 62 that is preferably releasably attached to the second member 20 in order to restrict separation of the first member 15 from the second member 20. Preferably the second member 20 includes an extension 65 that defines a slot 66 for releasable receipt of one of the selected links 60A in the link member 60. The first member 15 can further include telescoping means 70 for extending or shortening the length of the first member 15.

The tire handling tool of the present invention is preferably of steel and aluminum construction so as to provide a simple, compact, light weight and sturdy device.

Although the above description above contains many specificities, these should not be construed as limiting the scope of the invention but as merely providing illustrations of some of the presently preferred embodiments of this invention. As such, it is to be understood that the present invention is not limited to the embodiments described above, but encompasses any and all embodiments within the scope of the claims. It would be obvious to those skilled in the art that modifications may be made to the embodiments described above without departing from the scope of the present invention. Thus the scope of the invention should be determined by the appended claims in the formal application and their legal equivalents, rather than by the examples given.

I claim:

1. A tire handling tool comprising:
    a first member, and a second member connected to the first member via a connector that extends perpendicularly through the first member, the second member defines first and second legs that are positioned in parallel relation and define a spacing therebetween, wherein said spacing extends the approximate length of said second member, and further includes at least one stop that is adjustable along the length of the second member,
    a first end of the second member is pivotally connected to the first member, and
    a second end of the second member opposite the second member's first end includes a first bracket with at least one wheel,
    said first member defines a first end and a second end opposite said first member's first end,
    a second bracket having a roller member is attached to the second end of the first member,
    a tubular member, wherein a first end of the tubular member is attached to the first end of the first member and a second end of the tubular member is attached to the second end of the first member, and wherein said tubular member passes through said spacing of the second member between the stop and the first bracket,
    wherein urging the tubular member in a forward direction causes the tubular member to travel along said spacing in a first direction towards said first bracket and places the tire handling tool in a position for receiving a tire that is in the horizontal or lying position, and
    wherein urging the first member in a backward direction causes the tubular member to travel along said spacing in a second direction opposite said first direction causing the first bracket to raise, upwardly lifting the tire to a vertical position.

2. The tire handling tool as recited in claim 1, wherein the second bracket includes an adjustment hinge that positions the second bracket in communication with the tire when urging the first member.

3. The tire handling tool as recited in claim 2, further includes a link member defined by a plurality of links, said link member having a first end attached to the first member, and a second end releasably attached to the second member in order to restrict separation of the first member from the second member.

4. The tire handling tool as recited in claim 3, wherein said second member includes an extension that defines a slot for receipt of one of the selected links in the link member.

5. The tire handling tool as recited in claim 1, wherein the first member further includes telescoping means for extending or shortening the length of the first member.

6. The tire handling tool as recited in claim 1, wherein said first bracket defines a first angle of about 90 degrees for receiving a portion of the tire's tread surface.

7. The tire handling tool as recited in claim 1, wherein said second bracket defines a second angle of about 90 degrees for receiving a portion of the tire's tread surface.

8. The fire handling tool as recited in claim 1, wherein the first and second ends of the tubular member are integral to the first member.

9. A tire handling tool comprising:
    a first member, a second member having a first end pivotally connected to said first member, and wherein said second member defines a spacing that extends the approximate length of said second member,
    said second member further including a second end that includes a first bracket,
    said first member defines a first end and a second end,
    a second bracket is connected to the second end of the first member,
    a tubular member having a first end and second end, wherein the first end of the tubular member is attached to the first end of the first member and the second end of the tubular member is attached to the second end of the first member such that the tubular member passes through said spacing, wherein urging the tubular member in a forward direction causes the tubular member to travel along said spacing in a first direction towards said first bracket placing the tire handling to in a position for receiving a tire that is in the lying position, and urging the first member in a backward direction causes the tubular member to travel along said spacing in a second direction opposite said first direction raising the first bracket and lifting the tire to a vertical position, at least one stop that is adjustably positioned along the length of the second member, and wherein said tubular member passes through said spacing and is disposed between the stop and the first bracket.

10. The tire handling tool as recited in claim 9, wherein the second bracket includes an adjustment hinge that positions the second bracket in communication with the tire when urging the first member.

11. The tire handling tool as recited in claim 9, further includes a link member defined by a plurality of links, said link member having a first end attached to the first member, and a second end releasably attached to the second member in order to restrict separation of the first member from the second member.

12. The tire handling tool as recited in claim 11, wherein said second member includes an extension that defines a slot for receipt of one of the selected links in the link member.

13. The tire handling tool as recited in claim 9, wherein the first member further includes telescoping means for extending or shortening the length of the first member.

14. The tire handling tool as recited in claim 9, wherein said first bracket defines a first angle of about 90 degrees for receiving a portion of the tire's tread surface, and said second bracket defines a second angle of about 90 degrees for receiving a portion of the tire's tread surface.

15. A tire handling tool comprising:
a first member,
a second member having a first end pivotally connected to said first member,
wherein said second member defines a spacing having a length,
said second member further includes a second end that includes a first bracket,
said first member defines a first end and a second end,
a second bracket is hinged to the second end of the first member,
a first end of a tubular member is affixed to the first end of the first member and a second end of the tubular member is affixed to the second end of the first member such that the tubular member passes through said spacing,
wherein urging the tubular member in a forward direction causes the tubular member to travel along said length of said spacing in a first direction towards said first bracket placing the tire handling tool in a position for receiving a tire that is in the lying position, and urging the first member in a backward direction causes the tubular member to travel along said spacing in a second direction opposite said first direction raising the first bracket and lifting the tire to a vertical position,
at least one stop that is adjustably positioned along the length of the second member, and
wherein said tubular member is disposed between the stop and the first bracket.

16. The tire handling tool as recited in claim 15, wherein said first bracket defines a first angle of about 90 degrees for receiving a portion of the tire's tread surface, and said second bracket defines a second angle of about 90 degrees for receiving a portion of the tire's tread surface.

* * * * *